June 7, 1938.  S. McK. GRAY  2,119,577
STRAIN GAUGE FOR AND METHOD OF MEASURING STRAINS IN GLASS
Filed April 23, 1937
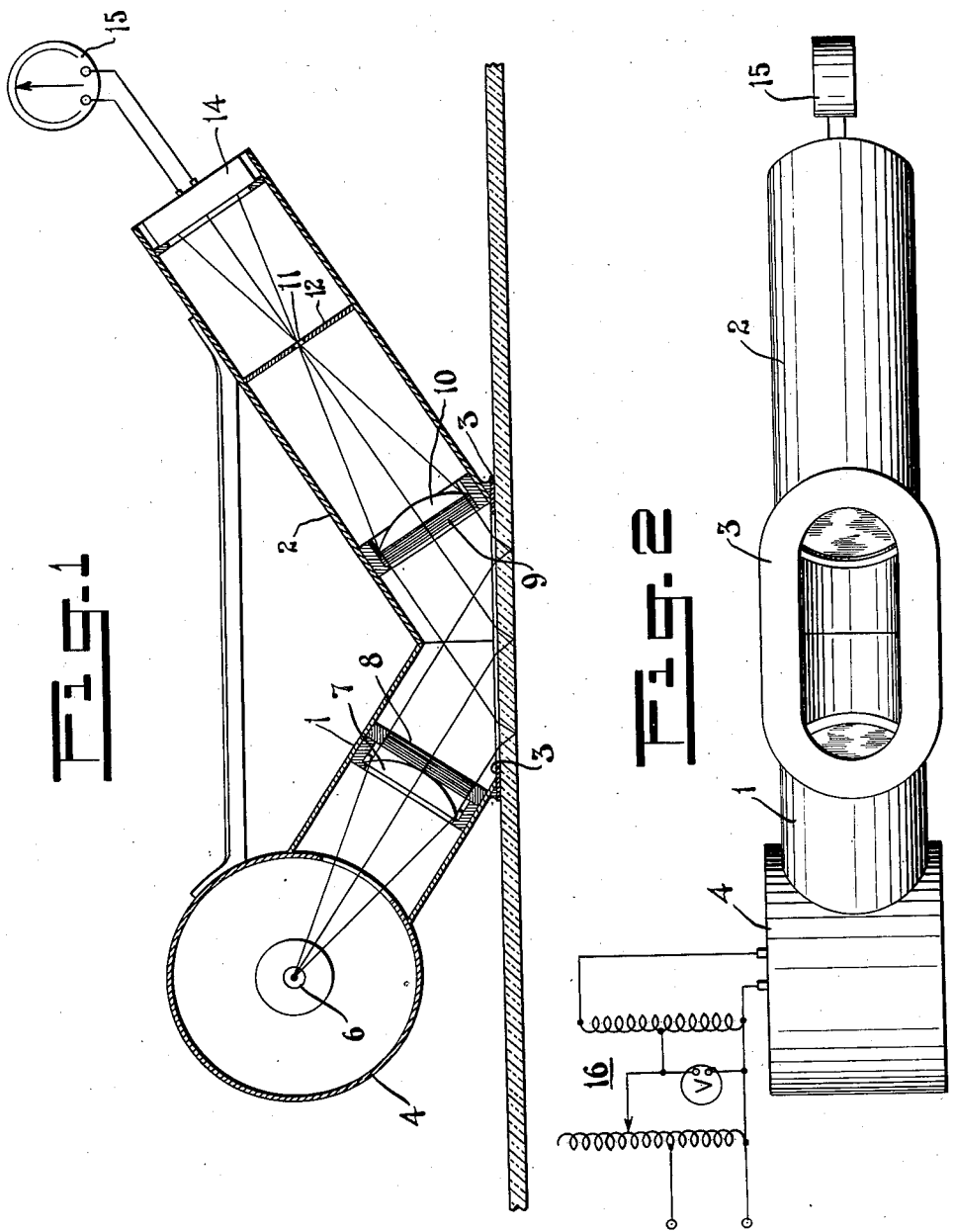
INVENTOR.
Samuel McK. Gray
BY
his ATTORNEY.

Patented June 7, 1938

2,119,577

UNITED STATES PATENT OFFICE 2,119,577

STRAIN GAUGE FOR AND METHOD OF MEASURING STRAINS IN GLASS

Samuel McK. Gray, Yonkers, N. Y., assignor to Electrical Testing Laboratories, New York, N. Y., a corporation of New York Application April 23, 1937, Serial No. 138,565

6 Claims. (Cl. 88—14)

This invention relates to a new and useful improvement in strain gauge for, and method of, measuring strains in glass. More particularly, the invention is designed for use in measuring conditions of strain in large sheets of plate glass, such as store fronts.

Not infrequently fractures in large plate glass windows occur more or less spontaneously, apparently because of excessive strains resulting from inadequate annealing or from warping or settling of the frames in which they are mounted. Detection and measurement of the strains makes it possible to determine and correct the causes of fracture and to reduce the considerable losses occasioned by them. Obviously, examination can be made only on the spot, not only because the conditions under which the glass is used may be the determining consideration, but also because of the impracticability of removing a large window from its frame and transporting it to a laboratory.

Furthermore, it is desirable, and often essential, that the examination be made from the outside only of the window because of the difficulty of gaining access to the inside without disturbing displays of merchandising, or other obstacles. This eliminates the ordinary polariscope using transmitted light as a suitable instrument for the purpose and calls for a device which is as small, light and portable as possible, which utilizes only the relatively small part of a projected beam of polarized light which is reflected from the rear surface of the glass under examination, and which will eliminate substantially all reflection of the light from the front surface of the glass, and also light transmitted through the glass from sources in the rear.

The device of this invention is based upon the principles of the polariscope, but meets these exacting conditions admirably. With it, the conditions of strain in any part of a sheet of glass may be determined quickly and easily, and, as a usual thing, directly in any desired terms, such as pounds stress per square inch, without computation.

One form of the device is shown in the drawing, in which:—

Fig. 1 is a view in section of the portable strain gauge;

Fig. 2 is a front view of the same gauge.

As shown in Figs. 1 and 2, the gauge consists of two tubes, 1 and 2, joined together at one end and opening into an annular aperture plate 3, at the same end. The inclination of each tube to the normal to the plane of the aperture plate is equal to the polarizing angle. The other end of the tube 1 is closed by housing 4. Within this housing is mounted a source of light 6, which should be as intense and concentrated as possible, such, for instance, as a capillary mercury arc lamp. A circuit for energizing the lamp is of course required. The character of this circuit will depend upon the type of lamp employed. That shown in Figure 2 of the drawing and generally indicated at 16 is suitable for the capillary mercury arc lamp suggested as an efficient source of light. Its nature will be readily understood by those skilled in the art so that no detailed description is required. For reasons which will hereinafter become evident it is advisable that means be provided in this circuit for adjusting the voltage impressed upon the light source and also a volt meter for indicating this voltage so that the intensity of the light source may be maintained uniform under varying conditions of current supply. Within tube 1 is also mounted a lens 7, suitable for bending the light from source 6 into rays parallel to the tube and a suitable plane polarizer 8, so oriented that the transmitted rays of light vibrate in a plane perpendicular to the plane of the aperture plate.

In tube 2 is mounted a monochromatic filter 9, backed by a condensing lens 10 suitable for focusing the reflected image of the light source 6 upon a slit 11 in a diaphragm 12 also mounted in tube 2 in such a way that the slit registers accurately with the reflected image of the light source. Beyond the diaphragm 12 in tube 2 is mounted a photo-electric cell 14, to which is connected a sensitive micro-ammeter 15 for measuring the currents originating in the photo-electric cell as the result of the impingement upon it of light rays passing through slit 11.

In use, the strain gauge is connected to a suitable source of electricity for supplying current to the light source 6, adjusted so that the correct voltage is impressed upon the light source. Then the aperture plate is placed against the surface of the glass. The light rays from the source 6, which have been made parallel by passing through the lens 7, will fall upon the surface of the glass exposed within the aperture plate. Since the parallel rays of light referred to have been plane polarized by polarizer 8 and vibrate in the plane of incidence, they will pass through the front surface of the glass, and none of them will be reflected therefrom. Assuming the glass to be unstrained, the light rays will pass through it and strike the rear surface at the polarizing angle. In consequence, they will all pass through the rear surface also, none being reflected.

On the other hand, if the area of glass under examination is strained, the entering beam of plane polarized light will become elliptically polarized in its passage therethrough. That is to say, it will be resolved into two components vibrating in directions respectively parallel and perpendicular to the strain axis. When these component vibrations have traveled to the rear surface, one of them will have become retarded in phase behind the other by an amount which is proportional to the thickness of the glass and to the average stress in the glass traversed by the vibrations.

Since these vibrations are incident on the rear surface of the glass at the polarizing angle, their components vibrating in the plane of incidence are not reflected, but are transmitted in entirety. The components vibrating in the plane perpendicular to the plane of incidence are partly reflected and partly transmitted, the reflected vibrations being plane polarized. The value of this reflected component will be determined by the birefringence of the glass. That is to say, the greater the strain, the larger this component will be, and in consequence the greater the intensity of the light reflected. It will be noted that the rear surface of the glass itself serves as a reflecting analyzer, and eliminates the prism or other analyzer ordinarily required in polariscopes utilizing transmitted light.

The reflected light then passes along the tube 2, through the monochromatic filter 9, and is concentrated by condensing lens 10 upon slit 11 in diaphragm 12. The light which passes through this slit falls upon the photo-electric cell 14, and will cause an electric current to be generated, the value of which will vary with the intensity of the light. This value will be indicated by the micro-ammeter 15.

Since the amount of reflected light will vary directly with the amount of strain in the glass, the micro-ammeter will indicate directly the amount of strain. Also, since the thickness and composition of plate glass windows is substantially unvarying, the micro-ammeter may be previously calibrated to read directly in stress units rather than in current values, thus eliminating the need of subsequent computation or reference to conversion tables in most instances.

The use of the mono-chromatic filter 9 is not essential, but if the source of light is a capillary mercury lamp, as suggested, it is advisable to use it, in order that the meaning of the meter deflection may not be confused with variations in the transmission of the shorter wave lengths of light through the glass. Such variations arise from the presence of various impurities in the glass, which, as is well known, have a decided effect upon the transmission of the shorter wave lengths, but relatively little effect upon the photo-elastic properties of the glass. A monochromatic filter transmitting a wave length near the middle of the visible spectrum is satisfactory, because the transmission of such a wave length is substantially unaffected by the considerations referred to.

On the other hand, if an incandescent lamp is used as a source of light, the mono-chromatic filter will in all probability be omitted, because, otherwise, an inadequate amount of light will be transmitted, and, because an incandescent lamp does not emit appreciable quantities of short wave light.

The filter may be mounted in tube 1, if desired, but, preferably, it is mounted in tube 2, as shown, because in this position it materially assists in blocking out light originating behind the glass, which might otherwise reach the photo-electric cell.

The slit 11 in diaphragm 12 should also be as small as possible for the same reason, i. e., to exclude from the photo-electric cell substantially all of the light derived from sources behind the glass. Therefore, as already explained, the source of light 6 should be as concentrated as possible, consistent with the requisite intensity, in order that its reflected image focused upon slit 11, may also be as small as possible to permit the dimensions of the slit to be kept at a minimum.

As is well known by those skilled in the art of polariscopes, the indication produced by strained specimens of glass is greatest when the azimuth of the stress with reference to the principal plane of the polarizer is 45°, and least when this azimuth is zero or 90°. Therefore, in use, the device of this invention should be rotated upon the glass about an axis perpendicular to the aperture plate until the greatest deflection of the meter is obtained. The same procedure should, of course, have been followed in calibrating the micro-ammeter with a standard specimen of glass artificially subjected to stresses of known value.

It will be understood, of course, that the calibration of the micro-ammeter, as suggested above, is not essential. If desired, the standard scale of the meter may be retained and the readings taken in micro-amperes. These alone will indicate, comparatively, the conditions of strain where actual values are not required.

Although the foregoing description of the invention has been confined to its use with glass, it may also be used in a similar manner for the detection and measurement of strains in all isotropic, transparent plastics, and the term "glass" is used herein in that broad sense.

I claim:

1. A device for measuring strains in sheet glass, which consists of a housing provided with an opening adapted to be closed by a sheet of glass, said housing containing a source of light, means for polarizing light rays from said source in a plane so oriented that the vibrations are in a plane perpendicular to the plane of said opening and means for collimating said rays and directing them through said opening at the polarizing angle for said sheet of glass, a diaphragm provided with a slit, means for focusing at said slit rays from said light source reflected at an angle equal to the angle of incidence from the rear surface of said sheet of glass placed against said opening, and photo-electrically-controlled means for determining the intensity of the rays so focused.

2. A device for measuring strains in sheet glass according to claim 1, in which the light source is a capillary mercury arc lamp.

3. A device for measuring strains in sheet glass according to claim 1, in which the dimensions of the slit correspond substantially with those of the reflected image of the light source focused at said slit.

4. A device for measuring strains in glass, which consists of two inclined tubes connected together at one end of each and provided with an opening at the same end adapted to be closed by a sheet of glass, the angle of inclination of each tube to the normal to the plane of said opening being the polarizing angle for said sheet of glass, a housing at the free end of one tube opening into said tube, a source of light within said housing, means in said tube for bending light rays from said source into a direction parallel to the axis of said tube so that they will be projected through said opening, a polarizer in said tube adapted to plane polarize said parallel rays of light in a plane so oriented that the vibrations are in a plane perpendicular to the plane of the opening, a diaphragm in said other tube provided with a slit, means in said other tube for focusing at said slit light rays reflected from the rear surface of said sheet of glass at an angle equal to the angle of incidence, and photo-electric means for determining the intensity of the light rays so focused at said slit.

5. A device for measuring strains in sheet glass, which consists of two inclined tubes connected together at one end of each and provided with an opening at the same end adapted to be closed by a sheet of glass, the angle of inclination of each tube to the normal to the plane of said opening being the polarizing angle for said sheet of glass, a housing at the free end of one tube opening into said tube, a source of light within said housing, means in said tube for bending light rays from said source into a direction parallel to the axis of said tube so that they will be projected through said opening, a polarizer in said tube adapted to plane polarize said parallel rays of light in a plane so oriented that the vibrations are in a plane perpendicular to the plane of the opening, a mono-chromatic filter in said other tube capable of passing light rays of a wave length in the mid-portion of the visible spectrum of said light, a diaghragm in said other tube provided with a slit, means in said other tube for focusing at said slit light rays reflected from the rear surface of said sheet of glass at an angle equal to the angle of incidence and photo-electric means for determining the intensity of the light rays so focused at said slit.

6. A method of detecting and measuring strains in sheet glass, which consists in projecting upon one surface of the glass at the polarizing angle for said sheet of glass rays of light which have been plane polarized in a plane so oriented that the vibrations are in a plane perpendicular to the plane of the glass, causing any of said rays which are reflected from the opposite surface of said glass to fall upon a photo-electric device and determining the amplitude of the currents generated by said photo-electric device.

SAMUEL McK. GRAY.